March 1, 1966   G. L. TRAVERS   3,237,669
TIRE CASINGS FOR USE ON ALL TYPES OF TERRAIN
Filed April 7, 1964
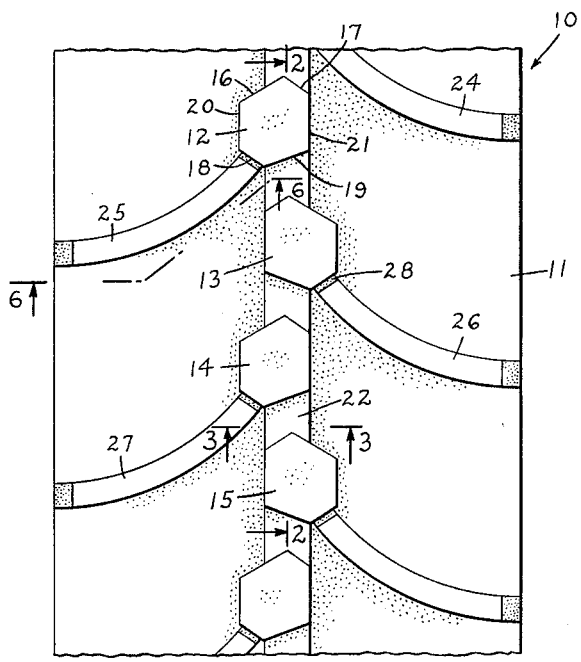
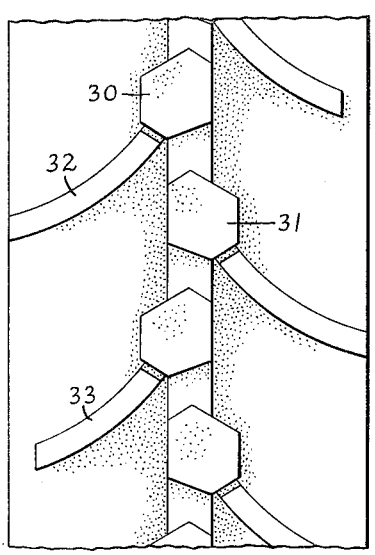
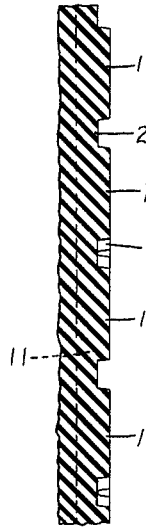
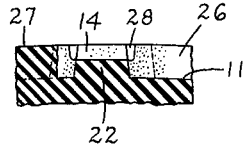
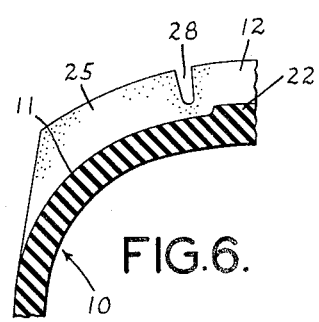
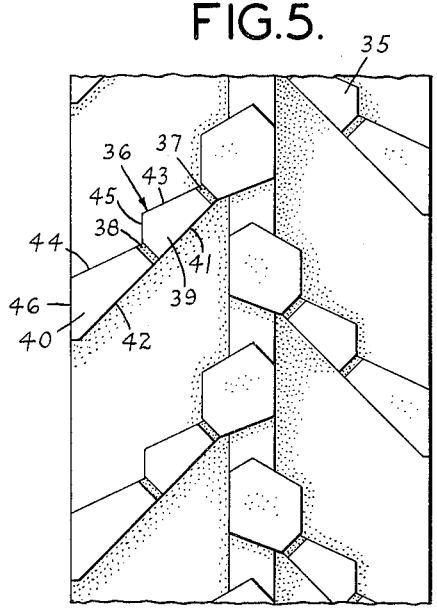
INVENTOR
GEORGES LOUIS TRAVERS
BY
HIS ATTORNEYS United States Patent Office 3,237,669
Patented Mar. 1, 1966

3,237,669
TIRE CASINGS FOR USE ON ALL TYPES
OF TERRAIN
Georges Louis Travers, Clermont-Ferrand, France, assignor to Compagnie Generale des Etablissements Michelin, raison sociale Michelin & Cie (Puy-de-Dome), France
Filed Apr. 7, 1964, Ser. No. 358,033
Claims priority, application France, Apr. 26, 1963,
932,984, Patent 1,368,146
11 Claims. (Cl. 152—209)

This invention relates to improvements in tire casings of the tube-containing and tubeless types which are suitable for use on equipment operating on all types of terrain, and particularly for use on vehicles such as tractors, earth moving or earth working equipment, off-highway trucks and the like, which must also be driven on the highways, at times.

Tires commonly used on equipment of the types mentioned above have a heavily cleated tread composed usually of a center rib extending circumferentially around the tire casing and having widely spaced cleats or bars extending laterally and alternately from opposite sides of the center rib in a generally herringbone pattern. The rib and bars or cleats are of substantial height in order to provide the necessary traction when operating on soft ground, in snow or other similar conditions and are correspondingly resistant to distortion and flexing. The rigidity of the rib and bars is of advantage when the tires are used on soft terrain but presents rather serious disadvantages when used on the highway or on hard surfaced terrain. When such tires are used for example on a highway, most of the load is carried by the center rib. Inasmuch as the rib and the tread as a whole are relatively rigid and have relatively restricted contact with the highway, the rib wears very rapidly. Moreover, the large mass of rubber or other elastomer in the tread and its inflexibility causes the tread to heat up with resulting deterioration of the tire casing. Also, such tires are very uncomfortable and noisy in highway operation because of the spacing of the bars or cleats of the tread.

In accordance with the present invention, a tire having a tread suitable for all terrain use is provided which minimizes the disadvantages of prior treads when used on the highway or on hard terrain while retaining the advantage of excellent traction when used in soft earth, mud, snow or similar off-highway conditions.

More particularly, in accordance with the present invention, a typical tire has a center row of large blocks of substantial height which provide a relatively wide central band affording an increased area of contact with a road or highway and laterally extending bars or cleats which improve the traction of the tire when operating on soft earth, in snow or similar conditions.

The use of relatively large and massive blocks in the central zone of the tread reduces wear on the tread when operating on hard ground or on the highway for they provide large load-bearing surfaces and good rigidity in depth without, however, having the rigidity circumferentially of the tire which characterizes a continuous central rib. Moreover, the provision of separate blocks provides a degree of flexibility or relative movement therebetween which facilitates the ejection of soil or snow sticking to the tread.

In a preferred form of the invention, the blocks are arranged in staggered relation, that is, partially offset alternately to the right and left of the median plane of the tire casing in order to promote increased flexibility and at the same time increase the width of the central zone which carries the load during operation of the vehicle on the highway or hard ground. It is advantageous to provide an offset relation between the tread blocks and the central zone which is at least 40% greater than the width of the blocks.

Preferably, the blocks are of a generally polygonal shape such as, for example, generally hexagonal, with either straight or curved sides and with the leading and trailing ends of the blocks formed by relatively inclined surfaces or edges which are disposed at an angle of 40° to 80° with respect to the median plane of the tire casing. The sides of the blocks are disposed either parallel with or at a relatively small angle up to about 15° with respect to the median plane of the tire. The shape of the blocks is such as to improve the adherence of the blocks to loose soil while at the same time preventing the sides of the blocks from throwing the earth laterally which would decrease the traction afforded by the blocks. The traction of the blocks is further enhanced by the offset relation of the blocks thereby providing spaces between the blocks which afford a better grip on the terrain.

The cleats or bars associated with the central row of blocks are substantially narrower than the length of the blocks. Thus, the transverse width of the blocks should be at least one and one-half times the maximum width of the bars or cleats and the average length of the blocks in a circumferential direction should be at least one and one-half times the maximum width of the bars parallel to the median plane of the tire. Separation of the blocks and the bars to improve the flexibility and operating life of the tread is made possible by providing a rib projecting from the surface of the tread and extending between and connecting the blocks. The rib has a height between 10 and 80% of the height of the block and a width about one-half the width of a block. Also, grooves are provided between the blocks and the bars which have a depth ranging from about 20 to 80% of the height of the blocks. In this way, substantial resistance to deflection of the bars and blocks during rolling is provided while nevertheless permitting relative flexing or articulation between the various blocks and the ribs to reduce the rigidity of the tread and its tendency to heat excessively.

The bars or cleats may be of any desired shape, such as, for example, straight or curved, and of uniform or variable width and length, as may be desired. Also, the bars may be composed of a plurality of shorter segments arranged in end to end relation.

For a better understanding of the present invention, reference may be had to the accompanying drawings, in which:

FIGURE 1 is a plan view of a portion of a tire having a tread of the type embodying the present invention thereon;

FIGURE 2 is a view in partial cross-section taken on line 2—2 of FIGURE 1;

FIGURE 3 is a view in partial cros-section taken on line 3—3 of FIGURE 1;

FIGURE 4 is a plan view of a tire having a modified form of tread thereon;

FIGURE 5 is a plan view of a portion of a tire having another form of a tread embodying the invention; and FIGURE 6 is a view in cross-section taken on line 6—6 of FIGURE 1.

Referring now to FIGURE 1, a typical all-terrain tire 10 has a tread surface 11 which in the central region is provided with outwardly extending tread blocks 12, 13, 14, 15 arranged in a row extending circumferentially of the tread. Each of the blocks, as illustrated, is of a polygonal shape and may be of an irregular hexagonal shape having a wider leading edge 16 and a narrower leading edge 17, both disposed at an angle between about 40° and 80° to the median plane of the tire casing. Similarly, the trailing edge of each block, for example, the block 12, is provided with a narrow edge 18 and a wider edge 19, these edges likewise being disposed at an angle between about 40° and 80° relative to the median plane of the tire casing. In a typical tire, the inclination of the surfaces 16, 17, 18 and 19 is approximately 60°. While the edges 16 to 19 are shown as straight, they may be curved, if desired. The side edges 20 and 21 of each block may be parallel with the median plane of the tire or inclined at an angle up to about 15°. These sides 20 and 21 may also be curved somewhat, if desired. Further, as shown in FIGURE 1, the blocks 12, 13, 14 and 15 are offset alternately with respect to the center line or median plane of the tire casing. The amount of offset should be between about 40 and 50% of the width of the blocks in order that a relatively wide center band of blocks is provided affording a better distribution of the load carried by the tire and resulting in decrease of the wear of the tire. In order to reinforce the blocks without unduly stiffening the center section of the tire, all of the blocks are connected by means of a rib 22 which extends circumferentially around the tire, this rib being of less height than the blocks as best shown in FIGURES 2, 3 and 6 of the drawings, and having its lateral edges aligned with the inner edges of the blocks. The height of the rib 22 is about 10% to 80% of the height of the blocks and, as illustrated in FIGURES 2 and 3, good results are obtained with a rib 22 aproximately 60% of the height of the blocks 12 to 15. In this way, a sturdy, relatively wide center band of blocks having good gripping action and load-carrying ability, is provided to improve the wearability of the tire when operating on hard surfaces and retain good traction when operating on soft ground, snow or similar terrain.

The tread further includes a plurality of laterally extending bars 24, 25, 26, 27, and so forth which extend across the tread and may be straight, or as illustrated, curved. The height of the bars above the surface 11 is approximately the same at their inner ends as the height of the blocks 12 to 15, and their outer surfaces lie in a common surface of revolution. In order to articulate the bars 24 to 27 with the blocks, a groove 28 is located between the end of each bar and a corresponding block, the depth of the groove being between about 20% and 80% of the height of a bar 24 to 27. As best shown in FIGURE 1, the bars extend outwardly from the narrower trailing face 18 of each block and form, in general, a continuation thereof having about the same width as the narrower face. The spacings between the blocks and between the bars and the blocks are such as to allow flexing with resulting ejection of dirt or other material from the grooves therebetween.

A modified form of tread is shown in FIGURE 4 in which the arrangement of the blocks 30, 31 is the same as that shown in FIGURES 1 to 6, the only difference being that alternate bars 32 and 33 on each side of the center line of the tire are of different lengths.

While the forms of treads shown in FIGURES 1 and 4 have continuous bars, as shown in FIGURE 5, the bars 35, 36 and so forth may be interrupted by means of grooves 37 and 38 to divide them into a series of shorter bars 39 and 40. The depth of the grooves 37 and 38 may be between 20% and 80% of the height of the bars. Also, the bars 35 and 36 may vary in width and shape as, for example, the bar 39 may be of generally pentagonal shape having a straight rear edge 41 aligned with the rear edge 42 on the bar 40. Both of the bars 39 and 40 have less sharply inclined leading edges 43 and 44 and lateral edges 45 and 46 which are parallel with the median plane of the tire. The arrangement of the leading edges of the bars enables them to penetrate soft terrain and react generally perpendicular to the median plane of the tire, thereby improving traction.

Other variations in shape of the blocks and the bars will be aparent to those skilled in the art. Accordingly, the forms of the invention described herein should be considered as illustrative.

I claim:
1. An all-terrain tire casing having a tread portion including a surface extending circumferentially of said casing, said tread portion comprising a row of spaced apart substantially polygonal blocks projecting outwardly from and disposed centrally of said surface and extending circumferentially of said casing, said blocks having angularly related leading and trailing faces, a bar extending laterally from one of said trailing faces on each of said blocks and projecting outwardly from said surface, said bars extending alternately in opposite directions and separated from said trailing face by a groove and rib portions of less height than said blocks and projecting outwardly from said surface and spanning the spaces between said blocks and reinforcing said blocks without unduly stiffening the central portion of said tread.

2. The tire casing set forth in claim 1 in which the length and width of each of said blocks exceeds the width of each bar.

3. The tire casing set forth in claim 1 in which the length of each block is at least one and one-half times the maximum width of each bar.

4. The tire casing set forth in claim 1 in which at least one end of each block has relatively inclined faces extending at an angle between about 40° and 80° to the median plane of said tire casing.

5. The tire casing set forth in claim 1 in which said blocks are offset laterally and alternately with respect to the median plane of said tire casing to form a supporting center zone between about 40% and 50% wider than the width of each block.

6. The tire casing set forth in claim 1 in which said rib portions are between 10% and 80% of the height of said blocks.

7. The tire casing set forth in claim 1 in which the grooves separating each bar from a trailing face of a corresponding block has a depth between about 20% and 80% of the height of said block.

8. The tire casing set forth in claim 1 in which said bars are interrupted along their lengths by transverse grooves.

9. An all-terrain tire casing having a tread portion including a surface extending circumferentially of said casing, said tread portion comprising a row of spaced apart blocks projecting outwardly from and disposed centrally of said surface and extending circumferentially of said casing, said blocks being of polygonal shape, each having angularly related narrow and wide faces at their leading and trailing ends, bars extending laterally from said blocks and projecting outwardly from said surface portion, said bars extending from and substantially perpendicular to one of said narrow faces and having a minimum width substantially the same as the width of said narrow face, said bars extending alternately in opposite directions, and rib portions of less height than said blocks and projecting outwardly from said surface and spanning the spaces between and reinforcing said blocks without unduly stiffening the central portion of said tread.

10. The tire casing set forth in claim 9 in which said bar is separated from the narrow face by a groove of less depth than the height of said bar.

11. The tire casing set forth in claim 9 in which the outermost surfaces of said blocks and bars lie substantially in a common surface of revolution.

References Cited by the Examiner
UNITED STATES PATENTS 2,539,617   1/1951   Gestwick _____ 152—209

FOREIGN PATENTS 180,212   11/1954   Austria.
185,130   1/1923   Great Britain.
830,133   3/1960   Great Britain.
1,009,954   6/1957   Germany.

ARTHUR L. LA POINT, *Primary Examiner.*